Feb. 10, 1970  S. A. SAYERS  3,494,044
HOOF-TO-GROUND ANGLE GAUGE FOR MEASURING
HORSES' HOOFS AND FEET

Filed Sept. 25, 1967  2 Sheets-Sheet 1

Witnesses

INVENTOR
Sam A. Sayers 3,494,044
HOOF-TO-GROUND ANGLE GAUGE FOR MEASURING HORSES' HOOFS AND FEET
Samuel Alexander Sayers, 706 E. Seco Drive, Box 754, Hobbs, N. Mex. 88240
Filed Sept. 25, 1967, Ser. No. 670,469
Int. Cl. A01l 11/00
U.S. Cl. 33—195                                      2 Claims

ABSTRACT OF THE DISCLOSURE

An apparatus employing the mechanisms of a wedge to increase the accuracy and convenience in checking or measuring horses' feet for level and angularity so that corresponding feet may be matched as perfectly as possible.

---

Figure 1:
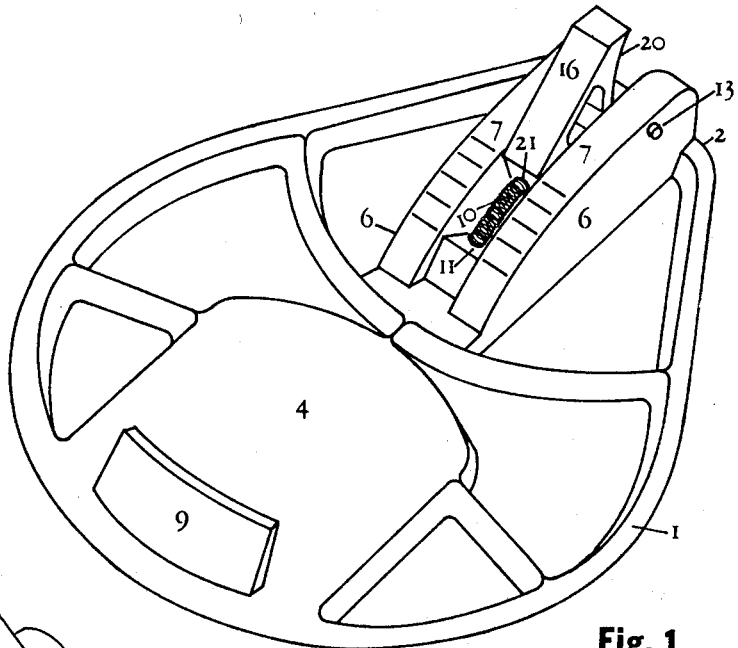

This invention relates to certain new and useful improvements in horse hoof gauges used in check and measuring the feet for level and angularity when inspecting, trimming, leveling, matching, and preparing the feet for shoes.

The principal objects of my invention and its improvements are more convenience and more accuracy by providing a gauge requiring no manual assistance in its function; a gauge that works and adjusts automatically when placed on the natural wedged shape of a horse's foot; a gauge promoting accuracy through simple rigid construction, yet revealing necessary information and results to the user while standing in the same position one would employ when trimming, leveling, or inspecting the foot; a gauge accommodating both the horse and user in the most convenient manner during the necessity of its employment; a gauge that can be applied handily and quickly as the intended usage will always be on a live object, which is never under complete control.

Figure 2:
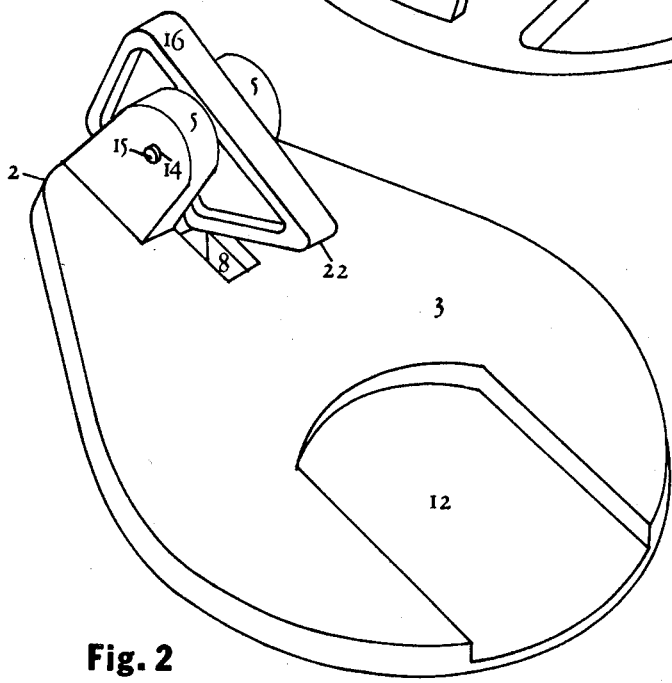
Figure 3:
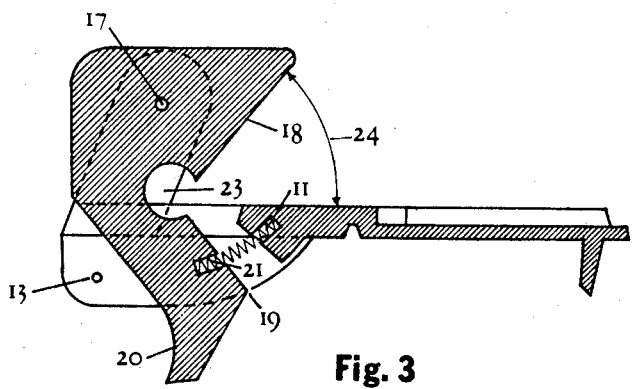
Figure 4:
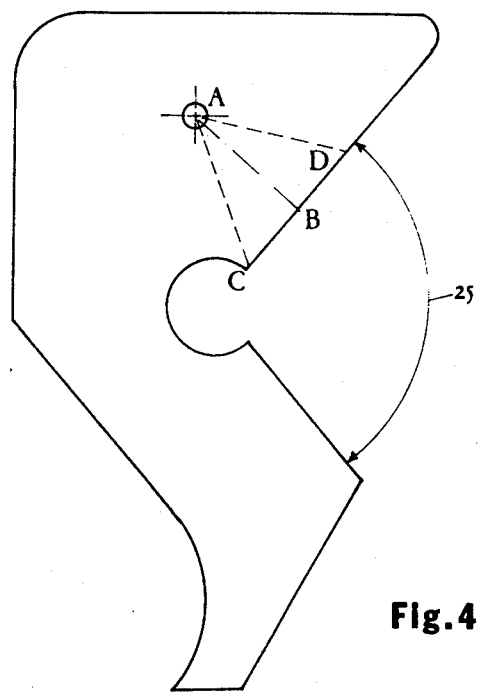

I attain these objects by the mechanism illustrated in the drawings, in which:

FIGURE 1 is the indicator side of baseplate.
FIGURE 2 is the surface plate side of baseplate.
FIGURE 3 is lateral section showing all the parts.
FIGURE 4 is side view of measuring bar.

The baseplate 1, FIGURE 1, is designed as a circle with a projectional section 2. The surface plate 3, FIGURE 2, with recess 12 for excessive frog, measures the bottom plane of the hoof. The indicator side 4 reveals the angularity.

The projectional section provides a base outside the surface plate area for the measuring bar 16, which functions on both sides of the baseplate. The projectional section serves as a base for the two brackets 5, which provide a pivotal point 14 for said measuring bar at sufficient distance from said baseplate that the pivotal point will oppose the midsection of the front slope of a horse's hoof.

The measuring bar is mounted vertically at point 17, FIGURE 3, fast to shaft 15 between the two brackets 5 at pivotal point 14, oscillating in slot 8, extending through to the divided surface of the elevated surface 6, which provides the segment of a circle on a radius from the axis of pivotal point 14. On the surface of this segment is a scale 7 having angle markings computed with respect to the axis of the pivotal point 14. Hand 19 of the measuring bar traverses this scale revealing the angularity of the hoof being measured. This is brought about by the planed surface 18, of the measuring bar which provides the variable side to a variable angle 24. The variable angle is adapted to utilize the mechanics of a wedged shaped object, such as a horse's foot, by the variable side being pivotal at a specified point that is equilateral from the planed surface of the variable side and also the measuring bar being limited in its travel. The wedging action forces the variable side or planed surface to automatically seek a parallel tight with the hoof wall, consequently, revealing on the indicator the most accurate measurement possible.

The straight compression spring 10, employed in slot 8 between the baseplate and measuring bar, is provided seats 11 and 21; both seats sufficient in depth to house the spring in its fully compressed position. The spring opposing the measuring bar on the indicator side forces the variable angle 24 on the surface plate side to a closed position of 40 degrees when not in use. This has the variable side or planed surface 18 in proper position prior to adapting gauge to the foot as the bar, when gauge is applied to the foot, is yieldingly resistant until the foot reaches maximum depth, thereby assuring a smooth operation. The foot utilizes the nose-end 22 in forcing the variable angle to open until angularity of the foot being checked has been reached. The pin 13 installed through both sides of the elevated surface 6, is used for stopping the measuring bar when at rest and limiting its travel. The end 20 of the measuring bar, which was intended for manual use, if and when needed, has been eliminated as it is not needed and posed extra weight. The vertex end 23 of the obtuse angle 25, FIGURE 4, is cut out to assure maximum depth of the foot into the variable angle and also to prevent clogging in that area. The handle 9 is positioned opposite the measuring bar allowing pressure to be applied in forcing foot to maximum depth of the variable angle.

The obtuse angle 25 is 100 degrees in size, which means that when the variable angle is standing at 50 degrees, the hand 19 is also standing at 50 degrees in its relation with the surface plate, which thereby adds to convenience as they both face the user when he applies gauge to the foot.

I claim:

1. A horse hoof gauge, wherein the improvements comprising of a measuring bar with the baseplate designed to conform by: a surface plate on said baseplate; a projectional section on said baseplate; a pair of brackets on said surface plate side, mounted on said projectional section, tilting toward the center of said surface plate; a pivotal point established on said pair of brackets, at sufficient length opposing said surface plate area to confront the midsection of the front slope of a horse's hoof, when the gauge is on the foot; a slot between said brackets extending through said projectional section and dividing elevated surface on the opposite side (herein after called indicator side); a shaft journalled through said pivotal point on said brackets horizontal to said surface plate; said measuring bar mounted fast to said shaft in a vertical pivotal position between said brackets, extending through said slot, through said projectional section to said indicator side; a hand on said measuring bar provided by said extension through said slot to said indicator side; a planed surface on said measuring bar providing an inclined plane relative to said surface plate, with a segment of said planed surface equilateral from the axis of said shaft; a fixed oblique limited variable angle formed on said baseplate by said surface plate, with a segment of said planed surface surface providing the variable side, and employing on its face an equalizing principle relative to its limited travel and location of said pivotal point; a scale mounted on said elevated surface on said indicator side, and adapted to be traversed by said hand; said scale having angle markings computed in degrees with respect to said axis of said shaft; said variable side of said variable angle adapted to adjust automatically to the natural wedged shape of a horse's foot, thereby measuring the angularity of said foot and revealing same in degrees on said indicator side.

2. A horse hoof gauge, wherein the improvements comprising of a measuring bar with the baseplate designed to conform by: a surface plate on said baseplate; a projectional section on said baseplate; a pair of brackets on said surface plate side, mounted on said projectional section, tilting toward the center of said surface plate; a pivotal point established on said pair of brackets, at sufficient length opposing said surface plate area to confront the midsection of the front slope of a horse's hoof, when the gauge is on the foot; a slot between said brackets extending through said projectional section and dividing elevated surface on the opposite side (herein after called indicator side); a shaft journalled through said pivotal point on said brackets horizontal to said surface plate; said measuring bar mounted fast to said shaft in a vertical pivotal position between said brackets, extending through said slot, through said projectional section to said indicator side; a hand on said measuring bar provided by said extension through said slot to said indicator side; a planed surface on said measuring bar providing an inclined plane relative to said surface plate, with a segment of said planed surface equilateral from the axis of said shaft; a fixed oblique limited variable angle formed on said baseplate by said surface plate and said planed surface, with said planed surface providing the variable side, and employing on its face an equalizing principle relative to its limited travel and location of said pivotal point; a scale mounted on said elevated surface on said indicator side, and adapted to be traversed by said hand; said scale having angle markings computed in degrees with respect to said axis of said shaft; said variable side of said variable angle adapted to adjust automatically to the natural wedged shape of a horse's foot, thereby measuring the angularity of said foot and revealing same in degrees on said indicator side by means of a straight compression spring employed on said indicator side in said slot with one end seated in said baseplate, and the opposite end seated in said hand end of said measuring bar; said spring holding said variable side to said variable angle at a closed position prior to adapting gauge to the foot, whereby forcing said variable angle to open, yieldingly resisted until maximum depth or angularity of the foot being checked has been reached.

References Cited

UNITED STATES PATENTS

| | | | |
|---|---|---|---|
| 583,706 | 6/1897 | Kearns et al. | 33—195 |
| 602,952 | 4/1898 | Millett | 33—195 |
| 616,256 | 12/1898 | Platt | 33—195 |
| 832,060 | 10/1906 | Holmquist | 33—195 |
| 2,702,430 | 2/1955 | Bohnet | 33—75 |

WILLIAM D. MARTIN, Jr., Primary Examiner

U.S. Cl. X.R.

33—75